Feb. 24, 1942.  H. L. GENTIL  2,274,597
FURNACE FOR THE REDUCTION OF METALS
Filed July 3, 1940  2 Sheets-Sheet 1

Inventor
Henri Louis Gentil
By
Watson, Cole, Grindle & Watson
Attorneys

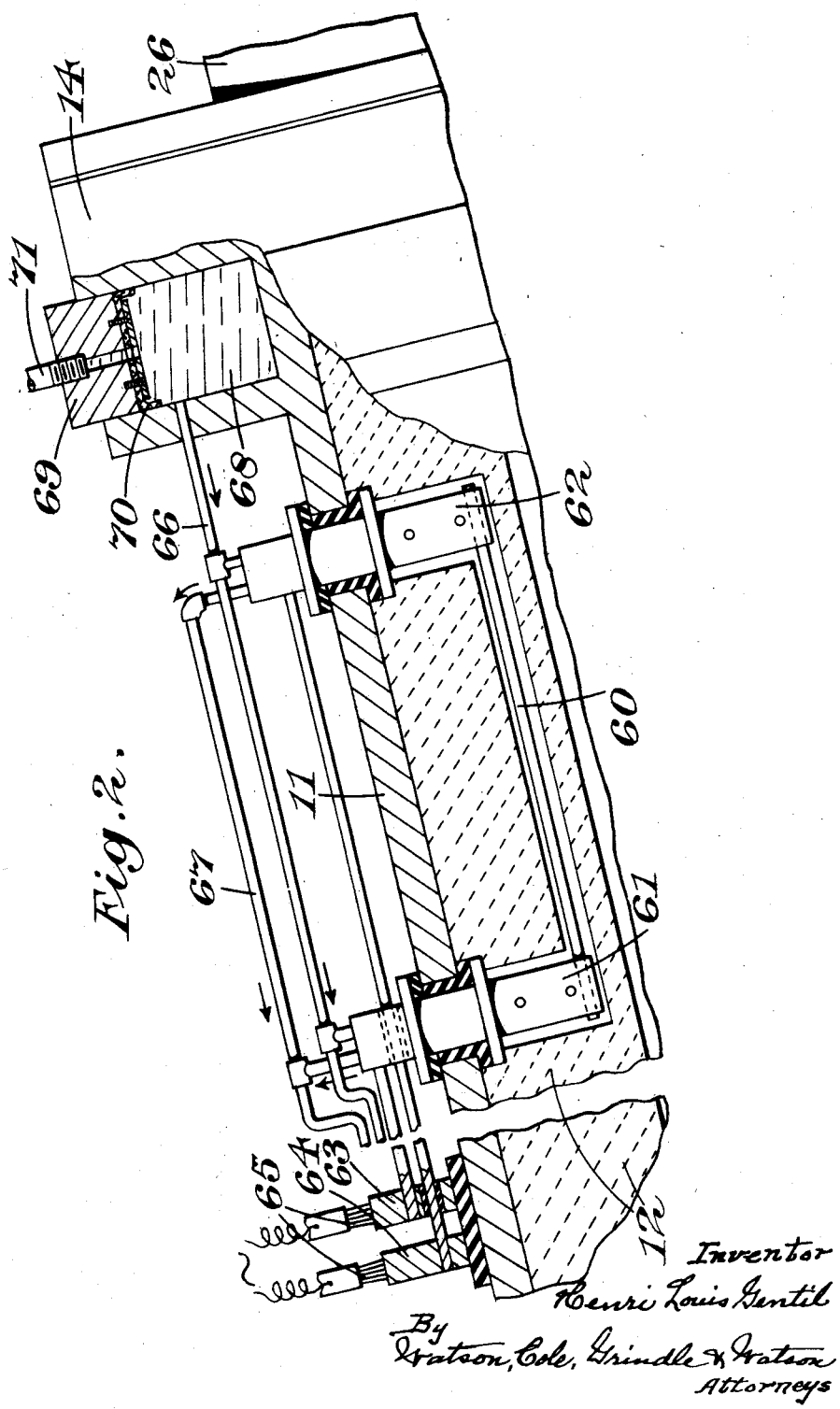

Patented Feb. 24, 1942

2,274,597

UNITED STATES PATENT OFFICE 2,274,597

FURNACE FOR THE REDUCTION OF METALS

Henri Louis Gentil, Paris, France, assignor to Alloy Processes Limited, London, England, a British company Application July 3, 1940, Serial No. 343,860
In Great Britain July 4, 1939

9 Claims. (Cl. 13—8)

This invention comprises improvements in or relating to furnaces for the reduction of metals. It has for its object to provide a furnace suitable for obtaining metals in metallic form from their ores. The furnace described is suitable for employment in the process set forth in our copending United States patent application Serial No. 325,842 for the recovery of magnesium and also for the recovery of aluminium and other metals. In the process described in the said patent application the magnesium is obtained in metallic form by distillation under vacuum and it is a feature of the furnace herein described that distillation to reduce metal under vacuum is possible therein.

According to the present invention a rotatable furnace comprises in combination an elongated casing having an axis inclined to the horizontal, which casing is lined with refractory material, means to rotate the casing about said axis, means to exhaust gases from the interior of the casing so as to maintain it under vacuum, means to introduce material which is to be treated to the casing at the upper end and to remove residues from the lower end without breaking the vacuum, a condensing chamber in communication with the casing at the lower end and means to heat the interior of the casing.

The interior of the casing may comprise two distinct heating zones with means for heating each zone to a different temperature, one zone near the upper end of the furnace being a preheating zone adapted to raise the zone to a temperature of the order of 600–700° C. and the other zone adjacent to the central portion of the furnace constituting a reduction zone adapted to be raised to a temperature of the order of 1100° C.

The means for feeding material to the furnace may consist of a non-rotatable hopper provided with vacuum retaining valves and connected to the rotatable casing of the furnace by labyrinth packing. The means for removing residues from the furnace may be a non-rotatable discharge chute provided with vacuum valves and connected to the lower end of the furnace by labyrinth packing.

Preferably the condensing chamber is non-rotatable and provided with removable water-cooled plates on which metallic vapours may condense.

There may be at the lower end of the casing a non-rotatable junction chamber connected to the lower end of the furnace by labyrinth packing and having in its lower portion an opening to the discharge chute and in the portion opposite to the inlet from the rotatable casing an opening to the condensing chamber. This permits metallic vapours evolved from the charge to pass directly across the junction chamber into the condensing chamber without any change of direction and therefore minimises condensation of metal on any parts before the vapours reach the condensing chamber.

The means for heating the furnace preferably consists of electrical heating units encased in the refractory lining of the furnace.

The following is a description by way of example of one form of furnace in accordance with the invention, reference being made to the accompanying drawings in which:

Figure 2 is a detail of a resistance heating unit therefor.

Figure 1:
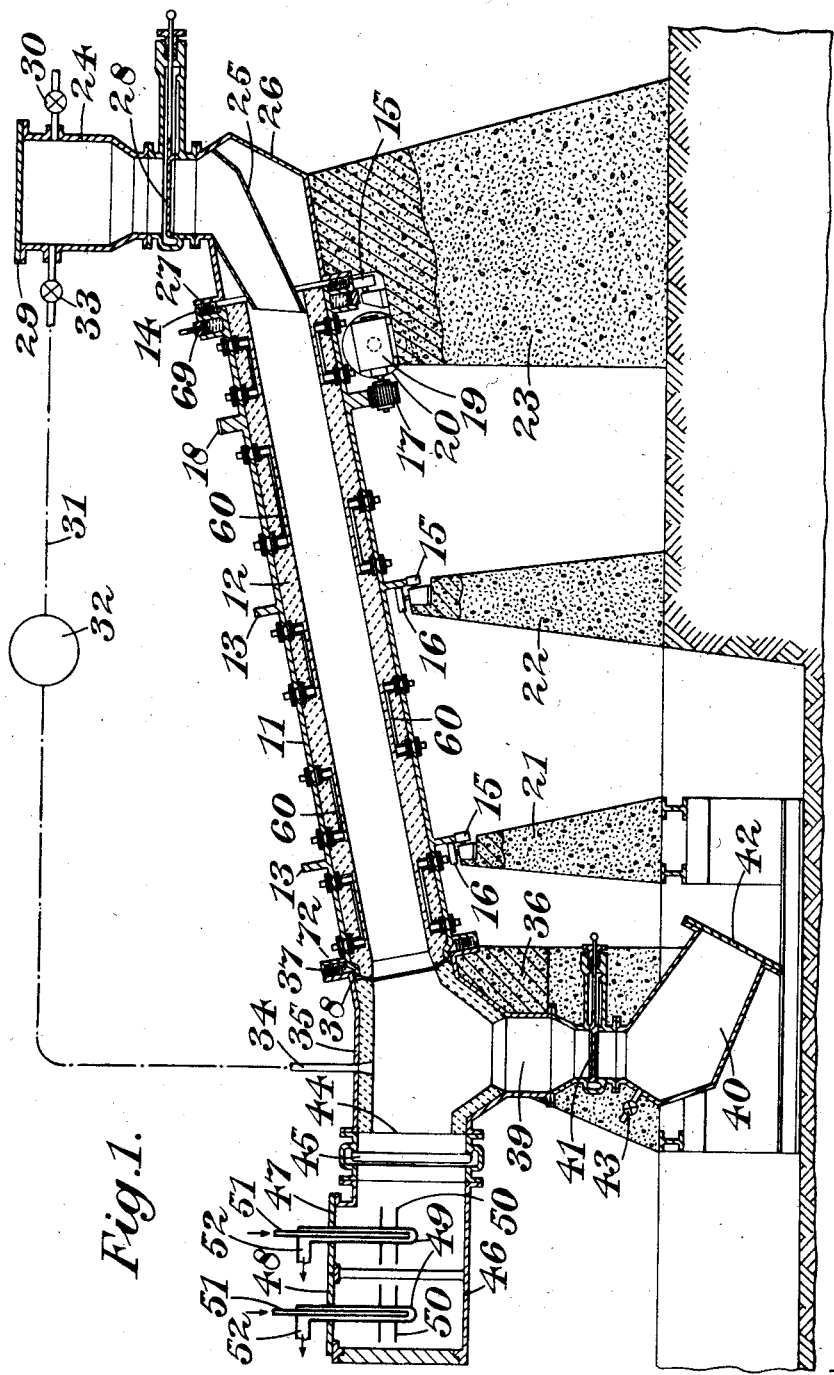
Figure 1 is a diagrammatic vertical central section through the furnace.

The furnace comprises a tubular metallic shell casing 11 lined with refractory material 12 and mounted for rotation about an axis inclined to the horizontal upon rings 13, 14 which rest on rollers 15. Support against downward endwise movement of the casing 11 during its rotation is given by rollers 16 which bear against the sides of the rings 13. Rotation is effected slowly by a pinion 17 which engages a gear ring 18 on the casing 11 and is driven through a reduction gear 19 by an electric motor 20. The whole is supported from the ground by concrete pillars 21, 22, 23 and the casing 11 may be of great length, for example fifty feet.

Means for feeding material to be treated to the furnace comprises a hopper 24 having at its lower end a chute 25 which enters the upper end of the refractory lining 12 of the furnace. The chute 25 is disposed inside a sealing chamber 26 which connects the bottom of the hopper 24 with the casing 11 through a labyrinth packing 27. The labyrinth packing may be, for example of the type employed in steam turbines for sealing the rotatable parts to the casing and preventing ingress of air, and it is intended in the present case to afford a seal such that a high vacuum may be maintained within the furnace. Between the hopper 24 and the sealing chamber 26 is a valve 28 and the top of the hopper is covered with a lid 29. When the hopper is to be filled the valve 28 is closed and the lid removed so that material for the charge may be introduced. Inasmuch as the hopper when it is open to the furnace will be under vacuum it is necessary to provide a vacuum-breaking valve 30 to be opened after the valve 28 is closed. In order to prevent air which enters the hopper, while it is being charged through the lid 29 from finding its way into the furnace when the valve 28 is opened again, a connection 31 is provided to a vacuum pump 32. A valve 33 is provided to shut this connection before the vacuum breaking valve 30 is opened.

The furnace is kept under vacuum during its normal operation by means of a connection 34 from the furnace to the vacuum pump 32.

At the lower end of the furnace is a junction chamber 35 which is non-rotatable and is supported upon a concrete structure 36. This is connected to the casing 11 by means of labyrinth packing 37 similar to the packing 27 at the upper end. The junction chamber 35 may be lined with refractory material, and as will be seen the end of the casing 11 has a spigot 38 which slightly enters the junction chamber and tends to prevent dust from the charge from working into the labyrinth packing. The junction chamber 35 has an opening 39 in its lower part which is connected to a discharge chute 40 through a vacuum-retaining valve 41. The discharge chute 40 has a bottom plate 42 which can be removed when the chute is full (and after the valve 41 has been closed) in order to permit the discharge of residues. A vacuum-breaking valve 43 is provided similar to the valve 30 already described and there may also, if desired, be a connection through a valve to the vacuum pump 32, the discharge chute at the outlet being operated in a similar manner to the hopper 24, but of course for the discharge of material instead of its admission into the furnace.

The junction chamber 35 has an outlet opening 44 on the opposite side of its connection to the casing 11 and this opening is connected through a vacuum-retaining valve 45 to a condensing chamber 46. The chamber 46 has two covers 47, 48 on which are secured water-cooled supports 49 for condenser plates 50. Cooling water is supplied through a pipe 51 to each of the supports 49 and withdrawn through an outlet 52. The supply and withdrawal of water is made through readily detachable flexible connections. As a consequence of this arrangement metallic vapours, such as vapours of magnesium, which may be produced in the furnace within the casing 11 can pass straight across the junction chamber 35 without meeting any obstruction and be condensed upon the water cooled plates 50. When a sufficient amount of material has condensed upon the plates 50 the valve 45 can be shut, the vacuum broken in the condensing chamber 46 and the condensed material removed by taking away the cover 47 and with it the condensing plates. A fresh cover and condensing plates may be quickly substituted and the valve 45 again opened without the general operation of the furnace having been interrupted. As before a vacuum-breaking valve and a connection to the vacuum pump 32 may be provided if desired. The construction of the valve 45 will be similar to that of the valves 28 and 41 already referred to but it will be understood that in the drawing, Figure 1, the sliding part of the valve is viewed endwise.

The furnace casing 11 with its refractory lining 12 is provided with a number of electrical heating units 60 which are disposed within the thickness of the refractory lining. These heating units may, for example, consist of carbon rods which are gripped as shown in Figure 2 at their ends between terminal electrodes 61, 62 which pass through the casing 11 and are insulated therefrom. These electrodes are connected to slip rings 63, 64 and supplied by electric current through brushes 65 bearing on the slip rings. The electrodes 61, 62 are provided with connections to water cooling pipes 66, 67. The supply pipes 66 draw from a chamber 68 in the end of the furnace adjacent to the ring 14 which contains the labyrinth packing 27. The water supply chamber 68 rotates with the casing but its walls are parallel and fit a non-rotatable closure ring 69 which is provided with a sealing leather 70 to bear against the walls of the chamber 68 and prevent leakage. A supply pipe 71 brings water to the chamber and thence it flows by the pipe 66 to the electrodes. The supply pipe or pipes 66 have connections to all the electrodes of the furnace and the withdrawal pipes 67 are similarly connected to all the electrodes and at the lower end of the furnace are connected to a drainage channel 72. It will be appreciated that the pipes 67 pass through the slip ring 64 while being electrically insulated therefrom. They also pass through the supporting rings 13 of the furnace casing. The mechanical details of these parts are not illustrated in the drawings as the construction will be obvious to any skilled person.

The electrical heating units 60 are so disposed as to produce in the upper portion of the tubular furnace constituted by the casing 11 a preheating zone for raising the reaction material which is introduced into the furnace to a suitable temperature. For example when operating in accordance with the before referred to patent application Serial No. 325,842, the temperature of the preheating zone will be of the order of 600 to 700° C. The length of the preheating zone may be, for example one-third of the total length of the furnace. In the central portion below the preheating zone there is a reaction zone which may occupy the major portion of the remainder of the length of the furnace and is raised to a higher temperature sufficient to correspond to the optimum temperature of reduction of the metal desired. Beyond this, in the lower portion of the furnace, there is a third zone which while not heated to so high a degree is nevertheless maintained at a temperature slightly above the distillation temperature of the metal under the reduced pressure which obtains in the furnace. The temperature of the central or reduction zone in the case of the reduction and distillation of magnesium is of the order of 1100° C.

The junction chamber 35 may be lined with refractory material if desired in order to reduce any tendency to the metal produced to condense upon its walls and if desired it may also contain heating elements sufficient to further minimise such a tendency.

Although in the drawings two condenser units 50 are shown in the same condenser chamber it will be appreciated that if desired the junction chamber 35 may carry outlets to more than one condenser chamber which may be used alternatively to one another in cases where it is important not to interrupt, even temporarily the condensation operation.

In the use of this furnace, for example for the distillation of magnesium, the magnesium bearing material such as dolomite may be introduced as described in the aforesaid United States Patent application Serial No. 325,842 through the hopper 24 into the furnace and preheated to a temperature of 700° C. so as to drive off carbon dioxide from the charge. As the furnace rotates the charge works itself away from the preheating zone to the reaction zone where its temperature is raised to 1100° C. so as to bring about reduction of the metal and its volatilisation. The volatilised metal passes through the furnace and condenses on the plates 50.

Alternatively the charge may be aluminium bearing material as described in application Serial No. 325,842 with the result that aluminium is the metal condensed. Other metals which are capable of distillation under vacuum may be similarly treated.

Undistilled refuse material or scoriae pass through the valve 41 at the end of the furnace into the discharge chute 40 from whence they are released from time to time as already described.

It will be appreciated that the provision of a further zone, below the reduction zone in the casing 11, which is maintained at a temperature above the volatilisation temperature of the metal ensures that no substantial condensation of the metallic vapours shall occur within the casing 11 and that all the vapours can be drawn off directly into the condensing chamber 46.

I claim:

1. A rotatable furnace comprising in combination an elongated vacuum-tight casing having an axis inclined to the horizontal, which casing is lined with refractory material, means to rotate the casing about said axis, exhausting means to withdraw gases from the interior of the casing so as to maintain it under vacuum, means to introduce material which is to be treated to the casing at the upper end and to remove residues from the lower end without breaking the vacuum, a condensing chamber in communication with the casing at the lower end and heating means within the casing to heat the space within the lining thereof and means to cool the condensing chamber.

2. A rotatable furnace as claimed in claim 1, wherein the interior of the casing comprises two distinct heating zones with separate heating means within the casing around each said zone for heating each zone to a different temperature, one zone near the upper end of the furnace being a preheating zone adapted to raise the zone to a temperature of the order of 600-700° C. and the other zone adjacent to the central portion of the furnace constituting a reduction zone adapted to be raised to a temperature of the order of 1100° C.

3. A furnace as claimed in claim 1, wherein the means for feeding material to the furnace consists of a non-rotatable hopper provided with vacuum-retaining valves and connected to the rotatable casing of the furnace by labyrinth packing.

4. A furnace as claimed in claim 1, wherein the means for removing residues from the furnace consists of a non-rotatable discharge chute provided with vacuum valves and connected to the lower end of the furnace by labyrinth packing.

5. A furnace as claimed in claim 1, wherein the condensing chamber is non-rotatable and provided with removable water-cooled plates on which metallic vapours may condense.

6. A furnace as claimed in claim 1, wherein the means for heating the furnace consists of electrical heating units encased in the refractory lining of the furnace and means for conducting electricity through vacuum-tight joints in apertures in the casing thereinto.

7. A furnace as claimed in claim 1, wherein the means for heating the furnace consists of electrical heating units encased in the refractory lining of the furnace, terminals therefor passing through vacuum-tight joints in apertures in the walls of the casing and electrical connections to slip rings mounted on the said walls.

8. A rotatable electric furnace comprising in combination a cylindrical elongated vacuum-tight casing rotatably mounted with its axis inclined to the horizontal, supporting bearings therefor, means for rotating the casing, a refractory lining to the casing, a feed hopper at the upper end of the casing connected thereto by labyrinth packing and having a vacuum lock to admit material from the hopper to the casing without breaking the vacuum, electrical heating resistances enclosed in the refractory lining, insulated terminals, for supplying said resistances, which pass through the walls of the casing and are connected to slip rings thereon, water-cooling passages in said terminals, means for supplying water thereto while the casing is rotating, a fixed junction-chamber at the lower end of the casing connected thereto by labyrinth packing, a residues-discharge chute therefrom closed by a discharge valve, a condenser attached to the junction chamber, cooling means for the condenser and a vacuum-pump connected to the space inside the casing to evacuate the same.

9. A rotatable furnace comprising in combination an elongated vacuum-tight casing having an axis inclined to the horizontal, which casing is lined with refractory material, means to rotate the casing about said axis, exhausting means to withdraw gases from the interior of the casing so as to maintain it under vacuum, heating means within the casing to heat the interior thereof, means to introduce material which is to be treated to the casing at the upper end without breaking the vacuum, a non-rotatable junction chamber at the lower end of the casing connected to the lower end of the furnace by vacuum-tight packing and having in its lower portion a discharge opening and, in the portion opposite to the inlet for the rotatable casing, a condenser opening, a discharge chute connected to said discharge opening, a vacuum-retaining valve on the discharge chute, a condensing chamber connected to said condenser opening, and a vacuum retaining valve between the junction chamber and the condensing chamber.

HENRI LOUIS GENTIL.